United States Patent
Vittenet et al.

(10) Patent No.: US 10,882,002 B2
(45) Date of Patent: Jan. 5, 2021

(54) ZEOLITE ADSORBENTS HAVING A HIGH EXTERNAL SURFACE AREA AND USES THEREOF

(71) Applicant: ARKEMA FRANCE, Colombes (FR)

(72) Inventors: Jullian Vittenet, Orthez (FR); Guillaume Ortiz, Pau (FR); Serge Nicolas, Lons (FR); Ludivine Bouvier, Orthez (FR); Cécile Lutz, Gan (FR)

(73) Assignee: Arkema France, Colombes (FR)

( * ) Notice: Subject to any disclaimer, the term of this patent is extended or adjusted under 35 U.S.C. 154(b) by 417 days.

(21) Appl. No.: 15/546,850

(22) PCT Filed: Jan. 29, 2016

(86) PCT No.: PCT/FR2016/050198
§ 371 (c)(1),
(2) Date: Jul. 27, 2017

(87) PCT Pub. No.: WO2016/124843
PCT Pub. Date: Aug. 11, 2016

(65) Prior Publication Data
US 2018/0015407 A1    Jan. 18, 2018

(30) Foreign Application Priority Data
Feb. 2, 2015    (FR) ...................................... 15 50783

(51) Int. Cl.
*B01D 53/02*    (2006.01)
*B01J 20/18*    (2006.01)
(Continued)

(52) U.S. Cl.
CPC .......... *B01D 53/02* (2013.01); *B01D 53/261* (2013.01); *B01J 20/165* (2013.01); *B01J 20/186* (2013.01);
(Continued)

(58) Field of Classification Search
CPC .......... B01J 20/18; B01J 20/28; B01D 53/02; B01D 53/26
See application file for complete search history.

(56) References Cited

U.S. PATENT DOCUMENTS 3,164,454 A * 1/1965 Wilson .................. C01B 13/027
                                                         95/130
4,424,144 A   1/1984 Pryor et al.
(Continued)

FOREIGN PATENT DOCUMENTS

EP    1 048 345 A1    11/2000
EP    1 240 939 A2     9/2002
(Continued)

OTHER PUBLICATIONS

Wiers et al. (Divalent and trivalent ion exchange with Zeolite A, Environ. Sci. Technol. 1982, 16, 617-624) (Year: 1982).*
(Continued)

*Primary Examiner* — Youngsul Jeong
(74) *Attorney, Agent, or Firm* — RatnerPrestia

(57) ABSTRACT

The present invention concerns the use, for gas separation and/or gas drying, of at least one zeolite adsorbent material comprising at least one type A zeolite, said adsorbent having an external surface area greater than 20 m²·g⁻¹, a non-zeolite phase (PNZ) content such that 0<PNZ≤30%, and an Si/Al atomic ratio of between 1.0 and 2.0. The invention also concerns a zeolite adsorbent material having an Si/Al ratio of between 1.0 and 2.0, a mesoporous volume of between 0.07 cm³·g⁻¹ and 0.18 cm³·g⁻¹, a (Vmicro−Vmeso)/Vmicro ratio of between −3 and 1.0, non-inclusive, and a non-zeolite phase (PNZ) content such that 0<PNZ≤30%.

9 Claims, 2 Drawing Sheets

(51) Int. Cl.
| | |
|---|---|
| *B01D 53/047* | (2006.01) |
| *B01J 20/28* | (2006.01) |
| *B01D 53/26* | (2006.01) |
| *B01J 39/09* | (2017.01) |
| *B01J 20/16* | (2006.01) |
| *B01J 39/14* | (2006.01) |
| *B01D 53/04* | (2006.01) |

(52) U.S. Cl.
CPC ... *B01J 20/28057* (2013.01); *B01J 20/28069* (2013.01); *B01J 20/28071* (2013.01); *B01J 20/28088* (2013.01); *B01J 39/09* (2017.01); *B01J 39/14* (2013.01); *B01D 53/047* (2013.01); *B01D 53/0462* (2013.01); *B01D 53/0476* (2013.01); *B01D 2253/1085* (2013.01); *B01D 2253/1122* (2013.01); *B01D 2253/306* (2013.01); *B01D 2253/311* (2013.01); *B01D 2256/24* (2013.01)

(56) References Cited

U.S. PATENT DOCUMENTS

| | | | | |
|---|---|---|---|---|
| 4,671,813 A | * | 6/1987 | Yoshino | F17C 9/04 62/643 |
| 5,112,590 A | * | 5/1992 | Krishnamurthy | B01D 53/047 422/187 |
| 5,245,099 A | * | 9/1993 | Mitariten | C10G 55/04 585/650 |
| 6,168,720 B1 | * | 1/2001 | Lavin | B01D 53/261 210/660 |
| 6,328,786 B1 | | 12/2001 | Labasque et al. | |
| 6,423,658 B1 | | 7/2002 | Thonnelier et al. | |
| 6,607,584 B2 | | 8/2003 | Moreau et al. | |
| 7,309,378 B2 | | 12/2007 | Bancon et al. | |
| 7,785,563 B2 | | 8/2010 | Ryoo et al. | |
| 8,476,180 B2 | * | 7/2013 | Hilaly | B01D 15/00 502/30 |
| 9,744,519 B2 | | 8/2017 | Lutz et al. | |
| 2010/0162738 A1 | * | 7/2010 | Low | C07C 21/18 62/101 |
| 2010/0263532 A1 | * | 10/2010 | Thomas | B01D 53/04 95/117 |
| 2012/0093715 A1 | | 4/2012 | Wang | |
| 2013/0052126 A1 | | 2/2013 | Wang | |
| 2013/0216627 A1 | | 8/2013 | Galbraith et al. | |

FOREIGN PATENT DOCUMENTS

| | | |
|---|---|---|
| EP | 1 312 406 A1 | 5/2003 |
| FR | 2 516 499 A1 | 5/1983 |
| FR | 2 794 993 A1 | 12/2000 |
| JP | H 02-157119 A | 6/1990 |
| JP | 2002-068732 A | 3/2002 |
| WO | WO 02/49742 A1 | 6/2002 |
| WO | WO 2007/043731 A1 | 4/2007 |
| WO | WO 2008/051904 A1 | 5/2008 |
| WO | WO 2008/109882 A2 | 9/2008 |
| WO | WO 2008/152319 A2 | 12/2008 |

OTHER PUBLICATIONS

Amran et al. (Nitrogen physical adsorption and adsorption equilibrium for natural gas dehydration on zeolite 3A and 4A, 2011, IEEE) (Year: 2011).*
Tao et al. (Mesopore-modified zeolites: Preparation, characterization, and applications, Chem. Rev. 2006, 106, 896-910) (Year: 2006).*
Alpay et al., Chem. Eng. Science, 49(18):3059-75 (1994).
Amran et al., IEEE, 5 pages (2011).
International Search Report for International Application No. PCT/FR2016/050198 dated Mar. 5, 2016.
Pahl et al., J. Chem. Eng. Data, 57:2465-71 (2012).
Peralta et al., Ind. Eng. Chem. Res., 51:4692-702 (2012).
Yang et al., Adsorption, 14:583-90 (2008).

* cited by examiner

ZEOLITE ADSORBENTS HAVING A HIGH EXTERNAL SURFACE AREA AND USES THEREOF

CROSS-REFERENCE TO RELATED APPLICATIONS

This patent application is a U.S. National Phase Patent Application of PCT Application No. PCT/FR2016/050198, filed Jan. 29, 2016, which claims priority to French Patent Application No. 1550783, filed Feb. 2, 2015, each of which is incorporated by reference herein in its entirety for all purposes.

FIELD OF THE INVENTION

The invention relates to the use of zeolite adsorbent materials in agglomerated form comprising at least one type-A zeolite, said adsorbents having a high external surface area characterized by nitrogen adsorption, and a high micropore volume, for gas phase separation, in particular in pressure swing processes, either of PSA (pressure swing adsorption) type, or of VSA (vacuum swing adsorption) type, or of VPSA (hybrid process of the previous two), or of RPSA (rapid pressure swing adsorption) type, in temperature swing processes of TSA (temperature swing adsorption) type and/or in pressure and temperature swing processes of PTSA (pressure and temperature swing adsorption) type.

The present invention also relates to a process for gas separation and purification using said zeolite adsorbents having a high external surface area.

The invention also relates to zeolite adsorbent materials that can be used in the context of the present invention comprising potassium and/or calcium and/or sodium.

The use of agglomerates of this type is particularly advantageous in applications where the transfer kinetics, the volumetric adsorption capacity, which are determining parameters for the overall efficiency and productivity of the process, and also low pressure drops are desired.

BACKGROUND OF THE INVENTION

In adsorption separation techniques, a great deal of effort has been given over the past few years to increasing the hourly productivity of the adsorbent beds, in particular by increasing the adsorption/desorption cycle frequency, which means that the adsorbent used, in addition to its thermodynamic adsorption properties, must be able to become saturated by adsorption and to release the adsorbed gas on desorption in increasingly short time periods. The adsorbents must thus be designed so as to have the most efficient mass transfer possible, that is to say such that the gases to be separated or to be purified reach the adsorption sites as rapidly as possible and are also desorbed as rapidly as possible.

Several paths have been explored in order to achieve this objective. The first method proposed by the literature consists in decreasing the size of the adsorbent particles. It is generally accepted that the effect of this is to enable a more rapid diffusion of the gases in the macroporous network, the kinetic constant for transfer of matter being inversely proportional to the square of the diameter of the particles (or equivalent dimension, depending on the morphology of the adsorbents. Mention will for example be made of the article "*Adsorbent particle size effects in the separation of air by rapid pressure swing adsorption*", by E. Alpay et al., *Chemical Engineering Science*, 49(18), 3059-3075, (1994).

Document WO 2008/152319 describes the preparation, by spray-drying, of mechanically strong adsorbents of small sizes, which are for example used in portable concentrators of medical oxygen, as shown by document U.S. 2013/0216627. The main drawback of reducing the size of the adsorbent particles is the increase in the pressure drops in adsorbents and the high energy consumption that is associated therewith. This is particularly unacceptable in industrial gas production adsorption processes.

The second method consists in improving the intragranular transfer capability of the adsorbents, without changing the size thereof. International applications JP2157119, JP2002068732 and WO 2002/49742 describe adsorbents with improved kinetics, obtained by conversion of the agglomeration binder into zeolite active matter and also the associated gas separation processes, which are more efficient than with conventional particles.

Document WO 2008/051904 proposes a process for producing, by extrusion/spheronization of beads of zeolite adsorbents based on zeolites with improved diffusion. Document WO 2008/109882 describes, for its part, the preparation of high crush-strength adsorbents with improved mass transfer from zeolites and less than 15% of siliceous binder introduced in colloidal form.

Application EP 1 240 939 proposes selecting, for uses in a PSA or VSA process, adsorbents having a certain ratio between their kinetic transport constants for adsorbable compounds in the gas phase and in the solid phase. Document U.S. Pat. No. 6,328,786 defines a minimum threshold of mechanical strength and a kinetic coefficient above which the adsorbents are preferred for use in a PSA process. Application EP 1 048 345 describes high-macroporosity adsorbents produced by means of a spheronization and lyophilization technique.

A third method consists in improving the access to the adsorbent by using various forming geometries combining both reduced active material thicknesses and sufficiently wide fluid passage cross-sections to allow a flow with limited pressure drops. Mention may be made of adsorbent sheets and fabrics, monoliths of bee's nest type, foams or the like.

Document FR 2 794 993 proposes using heterogeneous beads, with an adsorbent of peripheral layer of small thickness coating an inert core: the diffusion distance is thus reduced, without increasing the pressure drops. This system has the defect of having a low volumetric efficiency: a significant part of the adsorber is taken up by matter which is inert in terms of adsorption, which has a considerable impact in terms of facility sizes and thus of investments, or even of weight, which can be bothersome, in the case of portable purification/separation equipment, for instance medical oxygen concentrators.

Patent applications U.S. 2012/0093715 and U.S. 2013/0052126 teach that it is possible to form monolithic zeolite structures with a hierarchical structure, by adding a polymer to the synthesis reaction medium: as for the adsorbent sheets and fabrics, the solids obtained have a very high macropore volume and a very high mesopore volume, these solids are thus not very dense and their volumetric efficiency is low, owing to their low volumetric adsorption capacity.

Thus, all these adsorbent geometries of various natures pose problems in terms of relatively complex processing, of mechanical fatigue or wear resistance and of low volumetric efficiency, since the active matter content is often reduced to the benefit of inert binders or other mechanical reinforcement fibers or since the materials obtained are not very dense.

There thus remains a need for zeolite adsorbents that are of use for the separation and purification of gases having good transfer properties which do not have the drawbacks associated with the use of the prior art adsorbents. In particular, there remains a need for a zeolite adsorbent having greater adsorption capacities and better adsorption/desorption kinetics, allowing in particular a more intensive use of processes, and in particular PSA, TSA or VPSA processes.

The inventors have now discovered that the abovementioned objectives can be totally or at least partially achieved by virtue of adsorbents specifically devoted to gas separation and purification uses as will be described now.

SUMMARY OF THE INVENTION

Thus, and according to a first aspect, the invention relates to the use, for gas drying and/or separation, of at least one zeolite adsorbent material comprising at least one type-A zeolite, said adsorbent having:

an external surface area, measured by nitrogen adsorption and expressed in $m^2$ per gram of adsorbent greater than 20 $m^2 \cdot g^{-1}$, and preferably between 20 $m^2 \cdot g^{-1}$ and 300 $m^2 \cdot g^{-1}$, and more preferably between 30 $m^2 \cdot g^{-1}$ and 250 $m^2 \cdot g^{-1}$ and even more preferably between 40 $m^2 \cdot g^{-1}$ and 200 $m^2 \cdot g^{-1}$, and most particularly between 50 $m^2 \cdot g^{-1}$ and 200 $m^2 \cdot g^{-1}$, a non-zeolite phase (PNZ) content such that $0 < PNZ \leq 30\%$, preferably $3\% \leq PNZ \leq 25\%$, more preferably $3\% \leq PNZ \leq 20\%$, advantageously $5\% \leq PNZ \leq 20\%$, even better still $7\% \leq PNZ \leq 18\%$, measured by XRD (X-ray diffraction), by weight relative to the total weight of the adsorbent, a mesopore volume of between 0.07 $cm^3 \cdot g^{-1}$ and 0.18 $cm^3 \cdot g^{-1}$, preferably between 0.10 $cm^3 \cdot g^{-1}$ and 0.18 $cm^3 \cdot g^{-1}$, and more preferably between 0.12 $cm^3 \cdot g^{-1}$ and 0.18 $cm^3 \cdot g^{-1}$, more preferably between 0.14 $cm^3 \cdot g^{-1}$ and 0.18 $cm^3 \cdot g^{-1}$, limits included, and an Si/Al atomic ratio of the adsorbent of between 1.0 and 2.0, preferably between 1.0 and 1.6, and entirely preferably between 1.0 and 1.4, all of the measurements being carried out on the adsorbent material at least 90% exchanged with calcium.

DETAILED DESCRIPTION OF THE INVENTION

Figure 1:
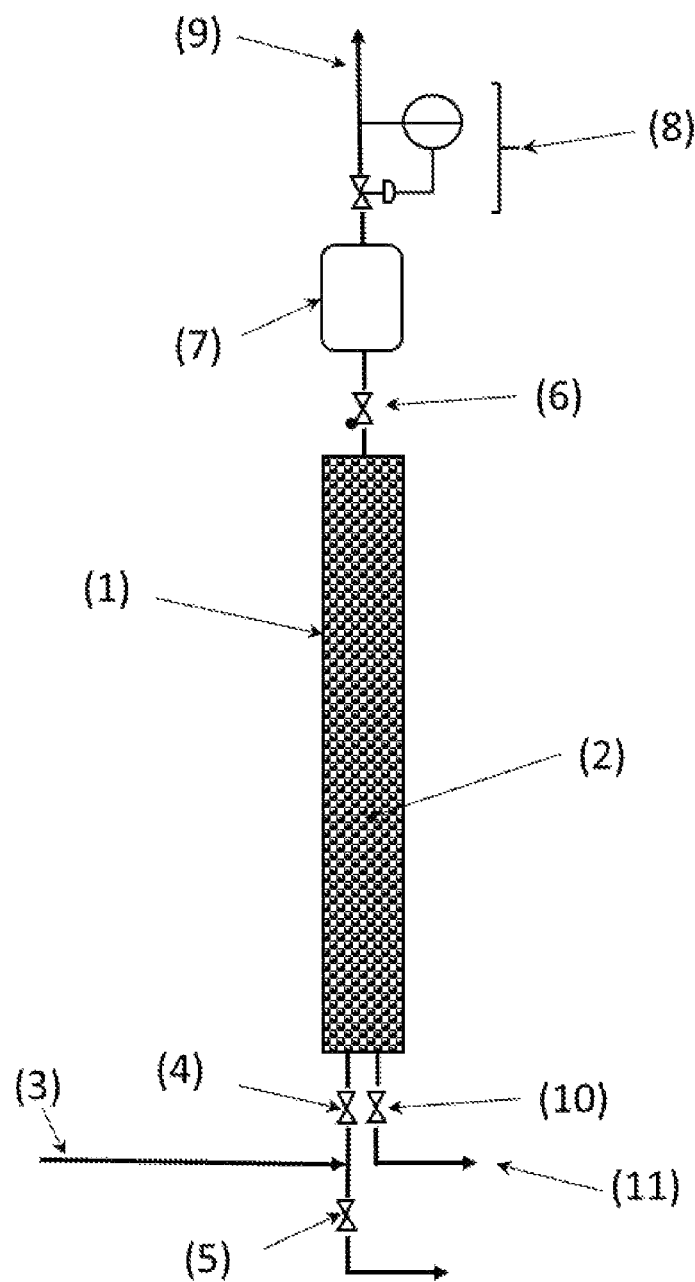
FIG. 1 is a schematic diagram of an embodiment of the invention.

In the present description, the term "type-A zeolite" denotes an LTA zeolite. According to one preferred embodiment, the type-A zeolite is a mesoporous A zeolite chosen from 3A, 4A and 5A zeolites. The term "3A" is intended to mean a zeolite of which the pore opening is equal to approximately 3 Å; the term "4A" is intended to mean a zeolite of which the pore opening is equal to approximately 4 Å; and the term "5A" is intended to mean a zeolite of which the pore opening is equal to approximately 5 Å.

According to one embodiment of the invention, the zeolite adsorbent material can also comprise one or more other zeolite(s) chosen from FAU zeolites (LSX, MSX, X, Y), LTA zeolites, CHA zeolites (chabazite), HEU zeolites (clinoptilolite), and mixtures of two or more of them, and more preferably from 3A, 4A and 5A zeolites, and mixtures of two or more of them.

Other zeolites may be present in minor amounts in the adsorbents of the invention or usable in the process of the invention. These zeolites can be considered to be pollutants, in particular because they do not contribute to gas adsorption, in other words they are inert with respect to gas adsorption. By way of nonlimiting examples, these zeolites comprise sodalite, hydroxysodalite, zeolite P, and other zeolites that are inert with respect to gas adsorption.

The various types of zeolites present in the zeolite adsorbent material are determined by XRD. The amount of zeolites is also measured by XRD and is expressed as % by weight relative to the total weight of the zeolite adsorbent material.

Consequently, in the present invention, the term "non-zeolite phase" (or "PNZ") denotes any phase present in the adsorbent material, other than the zeolite(s) defined above, called "zeolite phase" or "PZ". The amount of non-zeolite phase is expressed by the amount to be added to the zeolite phase of the adsorbent to make the total up to 100%, in other words:

$$\%PNZ = 100 - \%PZ,$$

where % PNZ represents the percentage by weight of PNZ and % PZ the percentage by weight of zeolite phase, relative to the total weight of the adsorbent.

The expression "adsorbent at least 90% exchanged with calcium" is intended to mean that at least 90% of the exchangeable catatonic sites of the zeolite phase are taken up by calcium cations.

This zeolite adsorbent material at least 90% exchanged with calcium can be obtained and preferably is obtained according to the following protocol: the zeolite adsorbent material to be exchanged with calcium is introduced into a solution of calcium chloride at 0.5 mol of $CaCl_2$ per liter, at 70° C., for 2 hours, with a liquid-to-solid ratio of 10 $ml \cdot g^{-1}$. The operation is repeated n times, n being at least equal to 1, preferably at least equal to 2, preferably at least equal to 3, more preferably at least equal to 4.

The solids resulting from the exchange operations n−1 and n are successively washed four times by immersion in water in a proportion of 20 $ml \cdot g^{-1}$ in order to remove the excess salt, and then dried for 12 hours at 80° C. in air, before being analyzed by X-ray fluorescence. If the weight percentage of calcium oxide of the zeolite adsorbent material, between the exchange operations n−1 and n, is stable at ±1%, said zeolite adsorbent material is considered to be "in its form at least 90% exchanged with calcium". Where appropriate, additional exchanges are carried out as described above until stability of the weight percentage of calcium oxide of ±1% is obtained.

It will in particular be possible to carry out successive batchwise cationic exchanges, with a large excess of calcium chloride, until this weight percentage of calcium oxide of the zeolite adsorbent material, determined by X-ray fluorescence chemical analysis, is stable at ±1%. This method of measurement is explained below in the description.

The Si/Al atomic ratio of the zeolite adsorbent material is measured by X-ray fluorescence elemental chemical analysis, a technique well known to those skilled in the art and explained below in the description.

If necessary, the calcium exchange is carried out before analyses according to the procedure described in detail above. On the basis of the micropore volume according to Dubinin-Raduskevitch measured on the zeolite adsorbent material exchanged with calcium, it is therefore possible to calculate an overall Dubinin-Raduskevitch volume of A zeolite(s), which is PNZ-weighted.

The term "Vmicro" is intended to mean the micropore volume of the zeolite adsorbent material, the measurement technique of which is explained below. The term "Vmeso" is intended to mean the mesopore volume of the zeolite adsorbent material, the measurement technique of which is explained below.

According to one preferred embodiment, said at least one zeolite adsorbent material that can be used in the context of the present invention has a (Vmicro−Vmeso)/Vmicro ratio of between −0.3 and 1.0, limits not included, preferably between −0.1 and 0.9, limits not included, preferably between 0 and 0.9, limits not included, more preferably between 0.2 and 0.8, limits not included, more preferably between 0.4 and 0.8, limits not included, preferably between 0.6 and 0.8, limits not included, where Vmicro is the micropore volume measured by the Dubinin-Raduskevitch method and Vmeso is the mesopore volume determined by the Barrett-Joyner-Halenda (BJH) method, all of the measurements being carried out on the adsorbent material at least 90% by weight exchanged with calcium.

According to yet another embodiment, said at least one zeolite adsorbent material has a micropore volume (Vmicro, or else Dubinin-Raduskevitch volume), expressed in cm$^3$ per gram of adsorbent material, of between 0.160 cm$^3 \cdot$g$^{-1}$ and 0.280 cm$^3 \cdot$g$^{-1}$, preferably between 0.180 cm$^3 \cdot$g$^{-1}$ and 0.280 cm$^3 \cdot$g$^{-1}$, preferably between 0.200 cm$^3 \cdot$g$^{-1}$ and 0.280 cm$^3 \cdot$g$^{-1}$, more preferably 0.220 cm$^3 \cdot$g$^{-1}$ and 0.280 cm$^3 \cdot$g$^{-1}$, measured on the adsorbent material at least 90% by weight exchanged with calcium.

The total volume of the macropores and mesopores of the zeolite adsorbent materials that can be used in the context of the present invention, measured by mercury intrusion, is advantageously between 0.15 cm$^3 \cdot$g$^{-1}$ and 0.50 cm$^3 \cdot$g$^{-1}$, preferably between 0.20 cm$^3 \cdot$g$^{-1}$ and 0.40 cm$^3 \cdot$g$^{-1}$ and very preferably between 0.20 cm$^3 \cdot$g$^{-1}$ and 0.35 cm$^3 \cdot$g$^{-1}$, the measurements being carried out on the adsorbent material at least 90% by weight exchanged with calcium.

The volume fraction of the macropores of the zeolite adsorbent material that can be used in the context of the present invention is preferably between 0.20 and 1.00 of the total volume of the macropores and mesopores, very preferably between 0.40 and 0.80 and even more preferably between 0.45 and 0.65, limits included, the measurements being carried out on the zeolite adsorbent material at least 90% by weight exchanged with calcium.

The zeolite adsorbent materials that can be used in the context of the present invention are either known or can be prepared using known procedures, or else are novel and in this respect are an integral part of the present invention.

According to yet another preferred embodiment, the use according to the invention employs a zeolite adsorbent material comprising at least one mesoporous A zeolite. The term "mesoporous" is intended to mean a zeolite which has, together with the microporosity inherent in the structure of the zeolite, internal cavities of nanometric size (mesoporosity), easily identifiable by observation using a transmission electron microscope (TEM), as described for example in U.S. Pat. No. 7,785,563.

More specifically, said A zeolite of the zeolite adsorbent material is a mesoporous A zeolite, that is to say a zeolite having an external surface area, defined by the t-plot method described below, of between 40 m$^2 \cdot$g$^{-1}$ and 400 m$^2 \cdot$g$^{-1}$, preferably between 60 m$^2 \cdot$g$^{-1}$ and 200 m$^2 \cdot$g$^{-1}$, limits included. By extension, for the purposes of the present invention, a "non-mesoporous zeolite" is a zeolite optionally having an external surface area, defined by the t-plot method described below, of strictly less than 40 m$^2 \cdot$g$^{-1}$.

In particular, the zeolite adsorbent materials that can be used in the context of the present invention comprise at least one A zeolite, in which said at least one A zeolite has an Si/Al ratio equal to 1.00+/−0.05, said Si/Al ratio being measured by solid silicon 29 nuclear magnetic resonance of ($^{29}$Si NMR), according to the techniques well known to those skilled in the art.

The Si/Al ratio of each of the zeolite(s) present in the adsorbent is also measured by NMR of the solid.

According to one preferred embodiment, the A zeolite of the zeolite adsorbent material is in the form of crystals, the number-average diameter of which, measured using a scanning electron microscope (SEM), is less than 20 μm, preferably between 0.1 μm and 20 μm, preferably between 0.1 and 10 μm, preferably between 0.5 μm and 10 μm, more preferably between 0.5 μm and 5 μm, limits included.

According to yet another preferred embodiment, said zeolite adsorbent material comprises at least one cation chosen from the ions of groups IA, IIA, IIIA, IB, IIB and IIIB of the periodic table, the trivalent ions of the lanthanide or rare earth series, the zinc(II) ion, the silver (I) ion, the cupric (II) ion, the chromium (III) ion, the ferric (III) ion, the ammonium ion and/or the hydronium ion, the preferred ions being calcium, lithium, sodium, potassium, barium, cesium, strontium, zinc and rare-earth ions and more preferably sodium, calcium and potassium ions, and mixtures thereof.

According to the present invention, the zeolite adsorbent materials described above are most particularly suitable and effective in processes for gas-phase separation and/or drying, in particular in pressure swing processes, either of PSA type, or of VSA type, or of VPSA type, or of RPSA type, or of TSA type and/or in processes of PTSA type.

More specifically, the present invention relates to the use of at least one zeolite adsorbent material comprising at least one A zeolite, as defined above, for gas separation and/or drying, more generally simply called "gas separation". The term "gas separation" is intended to mean drying, purification, pre-purification, elimination, and other separations of one or more gas compounds present in a mixture of one or more gas compounds. More specifically, the term "drying" is intended to mean the selective trapping, by adsorption with the zeolite adsorbent material, of the water molecules present in a gaseous medium. The term "drying" is thus included in the definition of the present description of the term "separation", the term "drying" having to be interpreted as the separation, from a gaseous medium, of the water molecules included in said gaseous medium.

According to one preferred aspect of the present invention, the zeolite adsorbent materials that can be used for the gas purification and drying are materials which only generate a slight pressure drop or pressure drops that are acceptable for the abovementioned uses.

Preference is thus given to the agglomerated and formed zeolite adsorbent materials prepared according to any techniques known to those skilled in the art, such as extrusion, compacting, agglomeration on a granulating plate or granulating drum, atomization and the like. The proportions of agglomeration binder and of zeolites used are typically those of the prior art, that is to say between 5 parts and 30 parts by weight of binder per 95 parts to 70 parts by weight of zeolite.

The zeolite adsorbent material that can be used in the context of the present invention, whether it is in the form of balls, extruded pieces or the like, generally has a volume mean diameter, or a mean length (largest dimension when it is not spherical), of less than or equal to 7 mm, preferably between 0.05 mm and 7 mm, more preferably between 0.2 mm and 5.0 mm and more preferentially between 0.2 mm and 2.5 mm.

The zeolite adsorbent materials that are of use in the context of the present invention also have mechanical properties that are most particularly suitable for the applications to which they are intended, that is to say:

either a bulk crush strength (BCS) in a bed, measured according to standard ASTM 7084-04, of between 0.5 MPa and 3 MPa, preferably between 0.75 MPa and 2.5 MPa, for a material having a volume mean diameter (D50) or a length (largest dimension when the material is not spherical), of less than 1 mm, limits included, or a single pellet crush strength, measured according to standards ASTM D 4179 (2011) and ASTM D 6175 (2013), of between 0.5 daN and 30 daN, preferably between 1 daN and 20 daN, for a material having a volume mean diameter (D50) or a length (largest dimension when the material is not spherical), greater than or equal to 1 mm, limits included.

According to another preferred embodiment, the use according to the invention uses at least one zeolite adsorbent material having a high volumetric adsorption capacity, that is to say a volumetric micropore volume expressed in $cm^3 \cdot cm^{-3}$ of adsorbent material at least 90% exchanged with calcium, said micropore volumetric volume being greater than $0.01\ cm^3 \cdot cm^{-3}$, preferably greater than $0.02\ cm^3 \cdot cm^{-3}$, more preferably greater than $0.03\ cm^3 \cdot cm^{-3}$, more preferably greater than $0.04\ cm^3 \cdot cm^{-3}$, more preferably greater than $0.05\ cm^3 \cdot cm^{-3}$.

According to yet another embodiment, the use according to the invention preferably uses at least one zeolite adsorbent material having a loss on ignition, measured at 950° C. according to standard NF EN 196-2, of between 0% et 5%, preferably between 0% and 3% by weight.

In particular, the present invention relates to the use of at least one zeolite adsorbent material as has just been defined, for drying cracked gases. The term "cracked gases" is defined as the gases obtained by cracking (for example steam cracking, catalytic cracking, catalytic dehydrogenation and the like) of hydrocarbon feed stocks, at high temperature (>350° C.), said feed stocks possibly being, for example, and in a non-limiting manner, LPG, ethane, naphtha, diesel oil, vacuum distillate, and the like. TSA processes are most particularly suitable for these cracked-gas-drying uses. It is in particular preferred to use, for these types of applications, the adsorbent materials comprising at least one 3A zeolite, which is preferably mesoporous.

For these types of applications, preference is given to a zeolite adsorbent material of which the volume mean diameter (or the longest length) is between 0.5 mm and 7.0 mm, preferably between 1.0 mm and 7.0 mm, and more preferably between 1.5 mm and 7.0 mm, limits included.

According to another embodiment, the present invention relates to the use of at least one zeolite adsorbent material as has just been defined, for drying and/or separating refrigerant fluids, in particular HFC and HFO, such as for example and in a non-limiting manner, 1,1,1,2-tetrafluoroethane, 2,3,3,3-tetrafluoropropene, and the like, for instance those cited in document WO 2007/144632. TSA processes are most particularly suitable for these refrigerant-fluid-drying uses. It is in particular preferred to use, for these types of applications, the adsorbent materials comprising at least one A zeolite, which is preferably mesoporous, chosen from 3A, 4A and 5A zeolites, and mixtures thereof.

For these types of applications, preference is given to a zeolite adsorbent material of which the volume mean diameter (or the longest length) is between 0.3 mm and 7.0 mm, preferably between 0.8 mm and 5.0 mm, more preferably between 1.0 mm and 4.0 mm, limits included.

According to another embodiment, the present invention relates to the use of at least one zeolite adsorbent material as has just been defined, for drying alcohols, and in particular ethanol, and in particular according to pressure swing (PSA) processes. It is in particular preferred to use, for these types of applications, adsorbent materials comprising at least one 3A zeolite, which is preferably mesoporous.

For these types of applications, preference is given to a zeolite adsorbent material of which the volume mean diameter (or the longest length) is between 0.3 mm and 7.0 mm, preferably between 0.8 mm and 5.0 mm, and more preferably between 2.0 mm and 5.0 mm, limits included.

According to another embodiment, the present invention relates to the use of at least one zeolite adsorbent material as has just been defined, for drying and/or separating air and industrial gases. TSA processes are most particularly suitable for these uses for drying air and industrial gases. It is in particular preferred to use, for these types of applications, the adsorbent materials comprising at least one A zeolite, which is preferably mesoporous, chosen from 3A, 4A and 5A zeolites, and mixtures thereof.

A most particularly advantageous application is the separation of nitrogen and oxygen from the air, according to a PSA or VPSA process, using a zeolite adsorbent material as previously defined, and comprising at least one 5A zeolite, which is preferably mesoporous.

For these types of applications, preference is given to a zeolite adsorbent material of which the volume mean diameter (or the longest length) is between 0.3 mm and 7.0 mm, preferably between 0.8 mm and 5.0 mm, and more preferably between 1.0 mm and 5.0 mm, limits included.

According to another embodiment, the present invention relates to the use of at least one zeolite adsorbent material as has just been defined, for purifying olefins, in particular for removing impurities, and preferably for removing oxygen-bearing impurities, and more preferably for removing methanol, in particular according to TSA adsorption processes. It is in particular preferred to use, for these types of applications, the adsorbent materials comprising at least one A zeolite, which is preferably mesoporous, chosen from 3A, 4A and 5A zeolites, and mixtures thereof, preferably from 3A and 4A zeolites, and mixtures thereof.

For these types of applications, preference is given to a zeolite adsorbent material of which the volume mean diameter (or the longest length) is between 0.3 mm and 7.0 mm, preferably between 0.8 mm and 5.0 mm, and more preferably between 2.0 mm and 4.0 mm, limits included.

According to another embodiment, the present invention relates to the use of at least one zeolite adsorbent material as has just been defined, for drying and/or separating natural gas, in particular for removing impurities and preferably for removing carbon dioxide, hydrogen sulfide and/or light mercaptans (containing one or two carbon atoms: $C_1SH$, $C_2SH$), in particular according to TSA, PSA or PTSA adsorption processes. It is in particular preferred to use, for these types of applications, the adsorbent materials comprising at least one A zeolite, which is preferably mesoporous, chosen from 3A, 4A and 5A zeolites, and mixtures thereof.

For these types of applications, preference is given to a zeolite adsorbent material of which the volume mean diameter (or the longest length) is between 0.3 mm and 7.0 mm, preferably between 0.8 mm and 5.0 mm, and more preferably between 2.0 mm and 5.0 mm, limits included.

According to another embodiment, the present invention relates to the use of at least one zeolite adsorbent material as has just been defined, for separating paraffins, preferably in the gas phase, in particular according to TSA adsorption processes. It is in particular preferred to use, for these types of applications, the adsorbent materials comprising at least one 5A zeolite, which is preferably mesoporous.

For these types of applications, preference is given to a zeolite adsorbent material of which the volume mean diameter (or the longest length) is between 0.3 mm and 7.0 mm, preferably between 0.8 mm and 5.0 mm, and more preferably between 2.0 mm and 5.0 mm, limits included.

According to another embodiment, the invention relates to the use of at least one zeolite adsorbent material as has just been defined, for drying and/or purifiying syngas. An example of a process for purifying syngas is described in patent EP 1 312 406. The syngases targeted here are in particular syngases that are based on hydrogen and carbon monoxide and/or on hydrogen and nitrogen (syngas for hydrogen production), and more particularly mixtures of hydrogen and carbon monoxide and/or of hydrogen and nitrogen, these syngases possibly also containing, or being polluted with, carbon dioxide and one or more possible other impurities, for instance, and in a nonlimiting manner, one or more impurities chosen from nitrogen, carbon monoxide, oxygen, ammonia, hydrocarbons and oxygen-comprising derivatives, in particular alkanes, in particular methane, alcohols, in particular methanol, and others.

The use according to the present invention is thus most particularly suitable for removing the nitrogen, the carbon monoxide, the carbon dioxide, the methane, and other impurities, preferably by pressure swing adsorption (PSA) processes, for hydrogen production. For these types of applications, adsorbent materials comprising at least one A zeolite, which is preferably mesoporous, chosen from 3A, 4A and 5A zeolites, and mixtures thereof, are preferred.

For these types of applications, preference is given to a zeolite adsorbent material of which the volume mean diameter (or the longest length) is between 0.3 mm and 7 mm, preferably between 0.8 mm and 5.0 mm, and more preferably between 1.0 mm and 3.0 mm, limits included.

According to another aspect, the invention relates to a zeolite adsorbent material having:
- an Si/Al ratio of said adsorbent, such that $1.0 \leq Si/Al < 2.0$, preferably $1.0 \leq Si/Al \leq 1.6$, more preferably $1 \leq Si/Al \leq 1.4$,
- a mesopore volume of between $0.07\ cm^3 \cdot g^{-1}$ and $0.18\ cm^3 \cdot g^{-1}$, preferably between $0.10\ cm^3 \cdot g^{-1}$ and $0.18\ cm^3 \cdot g^{-1}$, and more preferably between $0.12\ cm^3 \cdot g^{-1}$ and $0.18\ cm^3 \cdot g^{-1}$, more preferably between $0.14\ cm^3 \cdot g^{-1}$ and $0.18\ cm^3 \cdot g^{-1}$, limits included,
- of ratio (Vmicro−Vmeso)/Vmicro between −0.3 and 1.0, limits not included, preferably −0.1 and 0.9, limits not included, preferably 0 and 0.9, limits not included, more preferably between 0.2 and 0.8, limits not included, more preferably between 0.4 and 0.8, limits not included, preferably between 0.6 and 0.8, limits not included, wherein the Vmicro is measured by the Dubinin-Raduskevitch method and the Vmeso is measured by the BJH method, and
- a non-zeolite phase (PNZ) content such that $0 < PNZ \leq 30\%$, preferably $3\% \leq PNZ \leq 25\%$, more preferably $3\% \leq PNZ \leq 20\%$, advantageously $5\% \leq PNZ \leq 20\%$, even better still $7\% \leq PNZ \leq 18\%$, measured by XRD, by weight relative to the total weight of the zeolite adsorbent material,
all of the measurements being carried out on the zeolite adsorbent material at least 90% exchanged with calcium.

The zeolite adsorbent material of the invention as has just been defined is a novel material in that it results from the agglomeration, with a binder as described below, of at least one mesoporous A zeolite, where the term "mesoporous", already previously defined, denotes a zeolite which has, together with the microporosity inherent in the structure of the zeolite, internal cavities of nanometric size (mesoporosity), easily identifiable by observation using a transmission electron microscope (TEM), as described for example in U.S. Pat. No. 7,785,563.

More specifically, the zeolite adsorbent material comprises at least one mesoporous A zeolite, that is to say a zeolite having an external surface area, defined by the t-plot method described below, of between $40\ m^2 \cdot g^{-1}$ and $400\ m^2 \cdot g^{-1}$, preferably between $60\ m^2 \cdot g^{-1}$ and $200\ m^2 \cdot g^{-1}$, limits included.

In addition, the zeolite adsorbent material according to the invention comprises at least one metal chosen from potassium, sodium and calcium, and mixtures of two or more of these metals, preferably two metals chosen from potassium, sodium and calcium.

These characteristics make the zeolite adsorbent material according to the invention particularly suitable for gas treatments, as was described above in the present description.

The zeolite adsorbent material according to the invention can be in all the forms known to those skilled in the art, and preferably in simple geometric forms, that is to say in granular forms, for example of ball or rod type, that is to say in spherical or cylindrical forms, respectively. Such simple forms are most particularly suitable since they are easy to process, in particular because of their shapes and their sizes that are compatible with existing technologies. In addition, these simple forms mean that the processes used consume low amounts of energy, since the zeolite adsorbent material generates few pressure drops, and has improved transfer properties.

The zeolite adsorbent material according to the invention can be prepared according to any method known to those skilled in the art, and in particular, and preferably, using the process for preparing mesoporous A as described for example in WO 2007/043731 and by agglomerating the crystals obtained with at least one organic or mineral binder, preferably mineral binder, more preferably a binder chosen from zeolitizable or non-zeolitizable clays, and in particular from kaolins, kaolinites, nacrites, dickites, halloysites, attapulgites, sepiolites, montmorillonites, bentonites, illites and metakaolins, and also mixtures of two or more of these clays, in any proportions.

The agglomeration and the forming can be carried out according to all of the techniques known to those skilled in the art, such as extrusion, compacting, agglomeration on a granulating plate or granulating drum, atomization and the like. These various techniques have the advantage of allowing the preparation of adsorbent materials according to the invention which have the sizes and shapes previously described and are most particularly suitable for gas treatments.

The proportions of agglomeration binder (for example clays, as indicated above) and of zeolite(s) used for the preparation are typically those of the prior art, and vary according to the desired PNZ content and the degree of zeolitization of the binder. These proportions can be easily calculated by those skilled in the art specializing in the synthesis of zeolite agglomerates.

The agglomerates of the zeolite adsorbent materials, whether they are in the form of balls, extruded pieces or the like, generally have a volume mean diameter, or a mean length (largest dimension when they are not spherical), of less than or equal to 7 mm, preferably between 0.05 mm and 7 mm, more preferably between 0.2 mm and 5 mm and more preferentially between 0.2 mm and 2.5 mm.

The process for preparing the zeolite adsorbent materials according to the invention is readily adaptable from the preparation processes known to those skilled in the art, as already indicated, the use of at least one mesoporous A zeolite not substantially modifying these known processes, which means that the preparation process is a process that is easy, rapid and economical to implement and thus easily industrializable with a minimum of steps.

The zeolite adsorbent material of the invention preferably comprises at the same time macropores, mesopores and micropores. The term "macropores" is intended to mean pores of which the opening is greater than 50 nm, preferably between 50 nm and 400 nm. The term "mesopores" is intended to mean pores of which the opening is between 2 nm and 50 nm, limits not included. The term "micropores" is intended to mean pores of which the opening is less than 2 nm.

According to one preferred embodiment, the zeolite adsorbent material according to the present invention has a micropore volume (Dubinin-Raduskevitch volume), expressed in $cm^3$ per gram of zeolite adsorbent material, of between 0.160 $cm^3 \cdot g^{-1}$ and 0.280 $cm^3 \cdot g^{-1}$, preferably between 0.180 $cm^3 \cdot g^{-1}$ and 0.280 $cm^3 \cdot g^{-1}$, more preferably between 0.200 $cm^3 \cdot g^{-1}$ and 0.280 $cm^3 \cdot g^{-1}$, advantageously between 0.220 $cm^3 \cdot g^{-1}$ and 0.280 $cm^3 \cdot g^{-1}$, said micropore volume being measured on the zeolite adsorbent material at least 90% exchanged with calcium.

The total volume of the macropores and mesopores of the zeolite adsorbent materials according to the invention, measured by mercury intrusion, is advantageously between 0.15 $cm^3 \cdot g^{-1}$ and 0.50 $cm^3 \cdot g^{-1}$, preferably between 0.20 $cm^3 \cdot g^{-1}$ and 0.40 $cm^3 \cdot g^{-1}$ and very preferably between 0.20 $cm^3 \cdot g^{-1}$ and 0.35 $cm^3 \cdot g^{-1}$, the measurements being carried out on the adsorbent material at least 90% exchanged with calcium.

The volume fraction of the macropores of the zeolite adsorbent material is preferably between 0.2 and 1.0 of the total volume of the macropores and mesopores, very preferably between 0.4 and 0.8 and even more preferably between 0.45 and 0.65, limits included, the measurements being carried out on the zeolite adsorbent material at least 90% exchanged with calcium.

The size of the A zeolite crystals used to prepare the zeolite adsorbent material of the invention and also the size of the A zeolite elements in the zeolite adsorbent material are measured by observation under a scanning electron microscope (SEM). Preferably, the mean diameter of the A zeolite crystals is between 0.1 μm and 20 μm, preferably between 0.5 μm and 20 μm, and more preferably between 0.5 μm and 10 μm. The SEM observation also makes it possible to confirm the presence of non-zeolite phase comprising for example residual binder (not converted during the optional zeolitization step) or any other amorphous phase in the agglomerates.

According to one preferred embodiment, the zeolite adsorbent material according to the invention has an external surface area, measured by nitrogen adsorption and expressed in $m^2$ per gram of adsorbent, greater than 20 $m^2 \cdot g^{-1}$, and preferably between 20 $m^2 \cdot g^{-1}$ and 300 $m^2 \cdot g^{-1}$, more preferably between 30 $m^2 \cdot g^{-1}$ and 250 $m^2 \cdot g^{-1}$ and more preferably between 40 $m^2 \cdot g^{-1}$ and 200 $m^2 \cdot g^{-1}$, and most preferably between 50 $m^2 \cdot g^{-1}$ and 200 $m^2 \cdot g^{-1}$, the measurements being carried out on the zeolite adsorbent material at least 90% exchanged with calcium.

According to one preferred embodiment, the zeolite adsorbent material according to the invention has a high volumetric adsorption capacity, that is to say a volumetric micropore volume expressed in $cm^3 \cdot cm^{-3}$ of zeolite adsorbent material at least 90% exchanged with calcium, said volumetric micropore volume being greater than 0.01 $cm^3 \cdot cm^{-3}$, preferably greater than 0.02 $cm^3 \cdot cm^{-3}$, more preferably greater than 0.03 $cm^3 \cdot cm^{-3}$, more preferably greater than 0.04 $cm^3 \cdot cm^{-3}$, more preferably greater than 0.05 $cm^3 \cdot cm^{-3}$.

According to one preferred embodiment, the zeolite adsorbent material according to the invention comprises at least one mesoporous A zeolite as defined above, said at least one zeolite having an Si/Al ratio equal to 1.00+/−0.05, the measurements being carried out on the zeolite adsorbent material at least 90% exchanged with calcium.

According to yet another preferred embodiment, said zeolite adsorbent material comprises at least one cation chosen from the ions of groups IA, IIA, IIIA, IB, IIB and IIIB of the periodic table, the trivalent ions of the lanthanide or rare earth series, the zinc(II) ion, the silver (I) ion, the cupric (II) ion, the chromium (III) ion, the ferric (III) ion, the ammonium ion and/or the hydronium ion, the preferred ions being calcium, lithium, sodium, potassium, barium, cesium, strontium, zinc and rare-earth ions and more preferably sodium, calcium and potassium ions.

According to a further preferred aspect, the zeolite adsorbent material according to the invention does not have a zeolite structure other than the A (LTA) structure. The expression "does not have a zeolite structure other than the A structure" is intended to mean that an XRD (X-ray diffraction) analysis of the adsorbent material according to the invention does not make it possible to detect more than 5% by weight, preferably not more than 2% by weight, limits included, of zeolite structure other than an LTA structure, relative to the total weight of the zeolite adsorbent material.

According to yet another preferred embodiment, the material according to the present invention has a total macropore and mesopore volume, measured by mercury intrusion, of between 0.15 $cm^3 \cdot g^{-1}$ and 0.50 $cm^3 \cdot g^{-1}$, and a macropore volume fraction of between 0.2 and 1 time said total macropore and mesopore volume, preferably between 0.4 and 0.8, limits included, the measurements being carried out on the adsorbent material at least 90% exchanged with calcium.

Characterization Techniques

The physical properties of the zeolite adsorbent materials are evaluated by the methods known to those skilled in the art, the main ones of which are recalled below.

Zeolite Crystal Particle Size:

The estimation of the number-average diameter of the A zeolite crystals contained in the zeolite adsorbent materials, and which are used for preparing said zeolite adsorbent material, is carried out by observation under a scanning electron microscope (SEM).

In order to estimate the size of the zeolite crystals on the samples, a set of images is taken at a magnification of at least 5000. The diameter of at least 200 crystals is then measured using dedicated software, for example the Smile View software published by LoGraMi. The accuracy is of the order of 3%.

Zeolite Adsorbent Particle Size

The volume mean diameter (or "volume-average diameter") of the zeolite adsorbent material of the process according to the invention is determined by analysis of the particle size distribution of a sample of adsorbent material by imaging according to standard ISO 13322-2:2006, using a conveyor belt that allows the sample to pass in front of the objective of the camera.

The volume-average diameter is then calculated from the particle size distribution by applying standard ISO 9276-2: 2001. In the present document, the name "volume-average diameter" or else "size" is used for the zeolite adsorbent materials. The accuracy is of the order of 0.01 mm for the size range of the adsorbent materials which may be used in the context of the present invention.

Chemical Analysis of the Zeolite Adsorbent Materials—Si/Al Ratio and Degree of Exchange:

An elemental chemical analysis of a zeolite adsorbent material described above can be carried out according to various analytical techniques known to those skilled in the art. Among these techniques, mention may be made of the technique of chemical analysis by x-ray fluorescence as described in standard NF EN ISO 12677: 2011 on a wavelength-dispersive spectrometer (WDXRF), for example the Tiger S8 machine from the company Bruker.

X-ray fluorescence is a non-destructive spectral technique which exploits the photoluminescence of atoms in the x-ray range, to establish the elemental composition of a sample. Excitation of the atoms, generally with an x-ray beam or by electron bombardment, generates specific radiations after returning to the ground state of the atom. A measurement uncertainty of less than 0.4% by weight is conventionally obtained after calibration for each oxide.

Other methods of analysis are for example illustrated by the atomic absorption spectrometry (AAS) and inductively coupled plasma atomic emission spectrometry (ICP-AES) methods described in standards NF EN ISO 21587-3 or NF EN ISO 21079-3 on an apparatus of for example Perkin Elmer 4300DV type.

The x-ray fluorescence spectrum has the advantage of depending very little on the chemical combination of the element, which offers a precise determination, both quantitatively and qualitatively. After calibration for each oxide $SiO_2$ and $Al_2O_3$, and also the various oxides (such as those originating from the exchangeable cations, for example calcium), a measurement uncertainty of less than 0.4% by weight is conventionally obtained.

Thus, the elemental chemical analyses described above make it possible to verify both the Si/Al ratio of the zeolite used within the zeolite adsorbent material and the Si/Al ratio of the zeolite adsorbent material. In the description of the present invention, the measurement uncertainty for the Si/Al ratio is ±5%. The measurement of the Si/Al ratio of the zeolite present in the adsorbent material can also be carried out by solid silicon nuclear magnetic resonance (NMR) spectroscopy.

The quality of the ion exchange is linked to the number of moles of the cation in question in the zeolite adsorbent material after exchange. More specifically, the degree of exchange with a given cation is estimated by evaluating the ratio between the number of moles of said cation and the number of moles of all of the exchangeable cations. The respective amounts of each of the cations are evaluated by chemical analysis of the corresponding cations. For example, the degree of exchange with the calcium ions is estimated by evaluating the ratio between the total number of $Ca^{2+}$ cations and the total number of exchangeable cations (for example $Ca^{2+}$, $K^+$, $Li^+$, $Ba^{2+}$, $Cs^+$, $Na^+$, etc.), the amount of each of the cations being evaluated by chemical analysis of the corresponding oxides ($Na_2O$, $CaO$, $K_2O$, $BaO$, $Li_2O$, $Cs_2O$, etc.). This method of calculation also takes into account the possible oxides present in the residual binder of the zeolite adsorbent material. However, the amount of such oxides is considered to be minor compared with the oxides originating from the cations of the exchangeable sites of the zeolite(s) of the zeolite adsorbent material according to the invention.

Macropore and Mesopore Volume

The macropore and mesopore volume are measured by mercury intrusion porosimetry. A Micromeritics Autopore® 9500 mercury porosimeter is used to analyze the distribution of the pore volume contained in the macropores and in the mesopores.

The experimental method, described in the operating manual for the apparatus which refers to standard ASTM D4284-83, consists in placing a pre-weighed sample of zeolite adsorbent material to be measured (of known loss on ignition) in a porosimeter cell, then, after prior degassing (discharge pressure of 30 μmHg for at least 10 min), in filling the cell with mercury at a given pressure (0.0036 MPa), and then in applying an increasing pressure in steps up to 400 MPa in order to gradually cause the mercury to penetrate into the porous network of the sample.

In the present document, the macropore and mesopore volumes of the zeolite adsorbent materials, expressed in $cm^3 \cdot g^{-1}$, are thus measured by mercury intrusion and related to the weight of the sample in anhydrous equivalent, that is to say the weight of said material corrected for the loss on ignition. The measurements are carried out on the zeolite adsorbent material at least 90% exchanged with calcium.

Mechanical Strength of the Zeolite Adsorbent Materials:

The bulk crush strength in a bed of the zeolite adsorbent materials as described in the present invention is characterized according to standard ASTM 7084-04. The grain crush strengths are determined with a "grain crushing strength" apparatus sold by Vinci Technologies, according to standards ASTM D 4179 and D 6175.

Micropore Volume Measurement:

The micropore volume measurement is estimated by conventional methods such as Dubinin-Raduskevitch volume measurements (adsorption of liquid nitrogen at 77 K or of liquid argon at 87 K).

The Dubinin-Raduskevitch volume is determined from the gas, such as nitrogen or argon, adsorption isotherm measurement, at its liquefaction temperature, as a function of the pore openings of the zeolite: nitrogen will be chosen for the A zeolite, which is at least 90% exchanged with calcium beforehand. Prior to the adsorption, the zeolite adsorbent material is degassed at between 300° C. and 450° C. for a time of between 9 hours and 16 hours, under vacuum ($P < 6.7 \times 10^{-4}$ Pa). Measurement of the adsorption isotherms is then performed on a machine of ASAP 2020 type from Micromeritics, taking at least 35 measurement points at relative pressures of ratio P/P0 between 0.002 and 1. The micropore volume is determined according to Dubinin and Raduskevitch from the isotherm obtained, by applying standard ISO 15901-3 (2007). The micropore volume evaluated according to the Dubinin and Raduskevitch equation is expressed in $cm^3$ of liquid adsorbate per gram of zeolite adsorbent material. The measurement uncertainty is ±0.003 $cm^3 \cdot g^{-1}$, the measurements being carried out on the zeolite adsorbent material at least 90% exchanged with calcium.

Volumetric Micropore Volume Measurement:

The volumetric micropore volume is calculated from the micropore volume as defined above and by multiplying said micropore volume by the apparent density of said zeolite adsorbent material. The apparent density is measured as described in standard DIN 8948/7.6.

Loss on Ignition of the Zeolite Adsorbent Materials:

The loss on ignition is determined under an oxidizing atmosphere, by calcination of the sample in air at a temperature of 950° C.±25° C., as described in standard NF EN 196-2 (April 2006). The measurement standard deviation is less than 0.1%.

Qualitative and Quantitative Analysis by X-ray Diffraction

The purity of the zeolites in the zeolite adsorbent materials is evaluated by x-ray diffraction analysis, known to those skilled in the art by the acronym XRD. This identification is carried out on a Bruker XRD apparatus.

This analysis makes it possible to identify the various zeolites present in the adsorbent material since each of the zeolites has a unique diffractogram defined by the positioning of the diffraction peaks and by their relative intensities.

The zeolite adsorbent materials are ground and then spread and leveled out on a sample holder by simple mechanical compression.

The conditions under which the diffractogram is acquired on the Bruker D5000 machine are as follows:

Cu tube used at 40 kV–30 mA;
slit size (divergent, scattering and analysis)=0.6 mm;
filter: Ni;
sample device rotating at: 15 rpm;
measuring range: $3°<2\theta<50°$;
increment: 0.02°;
counting time per increment: 2 seconds.

Interpretation of the diffractogram obtained is performed with the EVA software with identification of the zeolites using the ICDD PDF-2 release 2011 base.

The amount of the LTA zeolite fractions, by weight, is measured by XRD analysis; this method is also used to measure the amount of the zeolite fractions other than LTA. This analysis is performed on a Bruker brand machine, and the amount by weight of the zeolite fractions is then evaluated using the TOPAS software from the company Bruker.

Measurement of the External Surface Area ($m^2/g$) Via the "t-plot" Method:

The "t-plot" calculation method exploits the adsorption isotherm data Q ads=f (P/P0) and makes it possible to calculate the micropore surface area. The external surface area may be deduced therefrom by determining the difference with the BET surface area which calculates the total pore surface area in $m^2/g$ (S BET=micropore surface area+external surface area).

To calculate the micropore surface area via the t-plot method, the curve Q ads ($cm^3 \cdot g^{-1}$) is plotted as a function of t=thickness of the layer depending on the partial pressure P/P0 that would be formed on a reference non-porous material (t function of log (P/P0): Harkins-Jura equation applied: $[13.99/(0.034-\log(P/P0))]^{0.5}$]. In the interval t between 0.35 nm and 0.5 nm, a straight line may be plotted which defines an adsorbed intercept point Q, which makes it possible to calculate the micropore surface area. If the material is not microporous, the straight line passes through 0, the measurements being carried out on the zeolite adsorbent material at least 90% exchanged with calcium.

Mesopore Volume Measurement:

The measurement of the mesopore volume is estimated by conventional methods such as the Barret-Joyner-Halenda volume measurements (adsorption of liquid nitrogen at 77 K).

The mesopore volume is determined from the gas, such as nitrogen, adsorption isotherm measurement, at its liquefaction temperature, as a function of the pore openings of the zeolite: nitrogen will be chosen for the A zeolite, which is at least 90% exchanged with calcium beforehand. Prior to the adsorption, the zeolite adsorbent material is degassed at between 300° C. and 450° C. for a time of between 9 hours and 16 hours, under vacuum ($P<6.7\times10^{-4}$ Pa). Measurement of the adsorption isotherms is then performed on a machine of ASAP 2020 type from Micromeritics, taking at least 35 measurement points at relative pressures of ratio P/P0 between 0.002 and 1. The mesopore volume is determined according to Barret-Joyner-Halenda from the isotherm obtained, by applying standard ISO 15901-2 (2007). The mesopore volume evaluated according to the Barret-Joyner-Halenda equation is expressed in $cm^3$ of liquid adsorbate per gram of zeolite adsorbent material, the measurements being carried out on the zeolite adsorbent material at least 90% exchanged with calcium.

The following examples serve to illustrate the present invention without aiming to limit the scope thereof as defined by the appended claims.

EXAMPLE 1

Preparation of a Zeolite Adsorbent Material According to the Invention

Step 1

Synthesis of Mesoporous A Zeolite with Addition of Nucleating Gel and Growth Gel a) Preparation of the Growth Gel A growth gel is prepared in a 1.5 liter glass reactor stirred with a 3-blade propeller at 600 rpm equipped with a heating jacket and a temperature probe, by mixing an aluminate solution containing 151 g of sodium hydroxide (NaOH), 112.4 g of alumina trihydrate ($Al_2O_3 \cdot 3H_2O$, containing 65.2% by weight of $Al_2O_3$) and 212 g of water at 35° C. over 5 minutes, with a stirring speed of 600 rpm, with a silicate solution containing 321.4 g of sodium silicate and 325 g of water at 35° C.

The stoichiometry of the growth gel is as follows: 3.13 $Na_2O/Al_2O_3/1.92$ $SiO_2/68$ $H_2O$. Homogenization of the growth gel is performed with stirring at 600 rpm for 15 minutes at 35° C.

b) Addition of the Nucleating Gel 11.2 g of nucleating gel (i.e. 1% by weight) of composition 2.05 $Na_2O/Al_2O_3/1.92$ $SiO_2/87$ $H_2O$ prepared in the same manner as the growth gel, and which has matured for 2 hours at 25° C., is added to the growth gel, at 35° C. with stirring at 300 rpm. After 5 minutes of homogenization at 300 rpm, the stirring speed is reduced to 190 rpm and stirring is continued for 30 minutes.

c) Introduction of the Structuring Agent into the Reaction Medium 35.7 g of a solution of [3-(trimethoxysilyl)propyl]octadecyldimethylammonium chloride (TPOAC) at 60% in methanol (MeOH) are introduced into the reaction medium with a stirring speed of 600 rpm (TPOAC/$Al_2O_3$ mole ratio=0.04). A maturation step is performed at 35° C. for 10 minutes at 300 rpm before starting the crystallization.

d) Crystallization

The stirring speed is lowered to 190 rpm and the set point of the reactor jacket is fixed at 105° C. so that the reaction medium increases in temperature to 97° C. over the course of 40 minutes. After 3 hours at a stationary temperature phase of 97° C., the reaction medium is cooled by circulating cold water through the jacket to stop the crystallization.

e) Filtration/Washing

The solids are recovered on a sinter and then washed with deionized water to neutral pH.

f) Drying

Drying is performed in an oven at 90° C. for 8 hours to obtain a solid with a loss on ignition of 20%.

Step 2

Calcium Exchange to Obtain a Mesoporous CaA Zeolite Powder a) Calcium Exchanges

A calcium exchange is carried out in order to obtain a micropore diameter of approximately 0.5 nm: the exchange conditions are the following: 50 g of dried powder are brought into contact with 500 cm$^3$ of 0.5 M CaCl$_2$ solution at 70° C. for 2 hours, and then the mixture is filtered and washing is carried out with 280 cm$^3$ of water. The operation is repeated 3 times (triple exchange). A degree of calcium exchange of 92% is obtained.

b) Drying

The drying is carried out in an oven at 90° C. for 8 hours in order to obtain a solid with a loss on ignition of 20%.

c) Calcination

The calcination of the dried product, required in order to free both the microporosity (water) and the mesoporosity by removing the structuring agent, is carried out by degassing under vacuum with a gradual increase in steps of 50° C. up to 400° C. for a period of between 9 hours and 16 hours, under vacuum (P<6.7×10$^{-4}$ Pa).

The micropore volume and the external surface area, measured according to the t-plot method from the nitrogen adsorption isotherm at 77 K after degassing under vacuum at 400° C. for 10 hours, are respectively 0.208 cm$^3$·g$^{-1}$ and 92 m$^2$·g$^{-1}$. The number-average diameter of the crystals is 0.8 µm. The mesopore diameters calculated from the nitrogen adsorption isotherm by the DFT method are between 5 nm and 10 nm. The XR diffractogram corresponds to a pure LTA structure, no other zeolite phases are detected. The Si/Al mole ratio of the mesoporous CaA zeolite determined by X-ray fluorescence is equal to 1.02.

Step 3

Preparation of Mesoporous CaA Zeolite Agglomerates

In the subsequent text, the weights given are expressed in anhydrous equivalent.

A homogeneous mixture consisting of 1700 g of mesoporous CaA zeolite crystals obtained in step 2, of 300 g of Zeoclay® attapulgite, sold by CECA, and also of the amount of water such that the loss on ignition of the paste before forming is 35%, is prepared. The paste thus prepared is used on a granulating plate in order to prepare balls of agglomerated zeolite adsorbent material. Selection by sieving of the balls obtained is carried out so as to collect balls having a diameter of between 0.3 and 0.8 mm and a volume-average diameter equal to 0.55 mm.

The balls are dried overnight in a ventilated oven at 80° C. They are then calcined for 2 h at 550° C. under nitrogen flushing, then 2 h at 550° C. under flushing with decarbonated dry air.

Step 4

Characterizations

The external surface area of the mesoporous CaA balls is equal to 92 m$^2$·g$^{-1}$ of adsorbent, the micropore volume is 0.202 cm$^3$·g$^{-1}$ of adsorbent. The volumetric micropore volume is 0.131 cm$^3$ per cm$^3$ of zeolite adsorbent material. The mesopore volume is equal to 0.140 cm$^3$·g$^{-1}$ of sodium-exchanged adsorbent. The total macropore and mesopore volume, measured by mercury intrusion, is 0.41 cm$^3$·g$^{-1}$ of adsorbent.

The Si/Al atomic ratio of the adsorbent is 1.25. The Si/Al ratio of the zeolite present in the adsorbent zeolite material, which is equal to 1.01, is determined by solid silicon 29 NMR.

The content of non-zeolite phase (PNZ), measured by XRD and expressed by weight relative to the total weight of the adsorbent, is 15.0%.

EXAMPLE 2

Comparative Zeolite Adsorbent Material

Siliporite® NK20 sieve from CECA is a material based on CaA zeolite agglomerated with attapulgite. The volumetric mean diameter of the balls is equal to 0.55 mm. The content of calcium oxide CaO, measured by ICP-AES, is 15.7% by weight relative to the total weight of sieve or a degree of Ca exchange related back to the powder of 92%.

The external surface area is equal to 39 m$^2$·g$^{-1}$ of adsorbent, the micropore volume is 0.238 cm$^3$·g$^{-1}$ of adsorbent. The volumetric micropore volume is 0.167 cm$^3$ per cm$^3$ of zeolite adsorbent material. The mesopore volume is equal to 0.07 cm$^3$·g$^{-1}$ of adsorbent. The total macropore and mesopore volume, measured by mercury intrusion, is 0.30 cm$^3$·g$^{-1}$ of sodium-exchanged adsorbent.

The Si/Al atomic ratio of the adsorbent is 1.23. The content of non-zeolite phase (PNZ), measured by XRD and expressed by weight relative to the total weight of the adsorbent, is 15.5%.

EXAMPLE 3

N$_2$/O$_2$ Separation Tests on a Fixed Bed of Adsorbent with Pressure Swing Adsorption An N$_2$/O$_2$ separation test is carried out by adsorption in a single column according to a principle presented in E. Alpay et al. (ibid.).

FIG. 1 describes the assembly produced. A column (1) of internal diameter equal to 27.5 mm and of internal height equal to 600 mm, filled with zeolite adsorbent material (2), is fed with dry air (3) intermittently by means of a valve (4). The time for feeding the column (1) with the stream (3) is called adsorption time. When the column (1) is not fed with dry air, the stream (3) is discharged into the atmosphere by the valve (5). The zeolite adsorbent material preferentially absorbs nitrogen, so that an oxygen-enriched air leaves the column via the non-return valve (6), to a buffering tank (7). A regulating valve (8) continuously delivers the gas at outlet (9) at a constant flow rate fixed at 1 NL·min$^{-1}$. When the column (1) is not fed, that is to say when the valve (4) is closed and the valve (5) is open, the column (1) is depressurized by the valve (10) to the atmosphere (11), for a period called the desorption time. The adsorption and desorption phases follow on from one another. The durations of these phases are fixed from one cycle to the other and they are adjustable. Table 1 indicates the respective state of the valves as a function of the adsorption and desorption phases.

TABLE 1

| Adsorption phase | Desorption phase |
|---|---|
| Valve (4) open | Valve (4) closed |
| Valve (5) closed | Valve (5) open |
| Valve (10) closed | Valve (10) open |

The tests are carried out successively with the zeolite adsorbent materials of example 1 (according to the invention) and of example 2 (comparative). The column is loaded at constant volume, with respectively 241.2 g and 259.2 g of adsorbent materials.

The pressure at the inlet is fixed at 280 kPa relative. The outlet flow rate is fixed at 1 NL·min$^{-1}$. The adsorption time is fixed at 0.25 s. The desorption time is variable between 0.25 s and 1.50 s. The oxygen concentration at outlet (9) is measured by means of a Servomex 570A oxygen analyzer.

Figure 2:
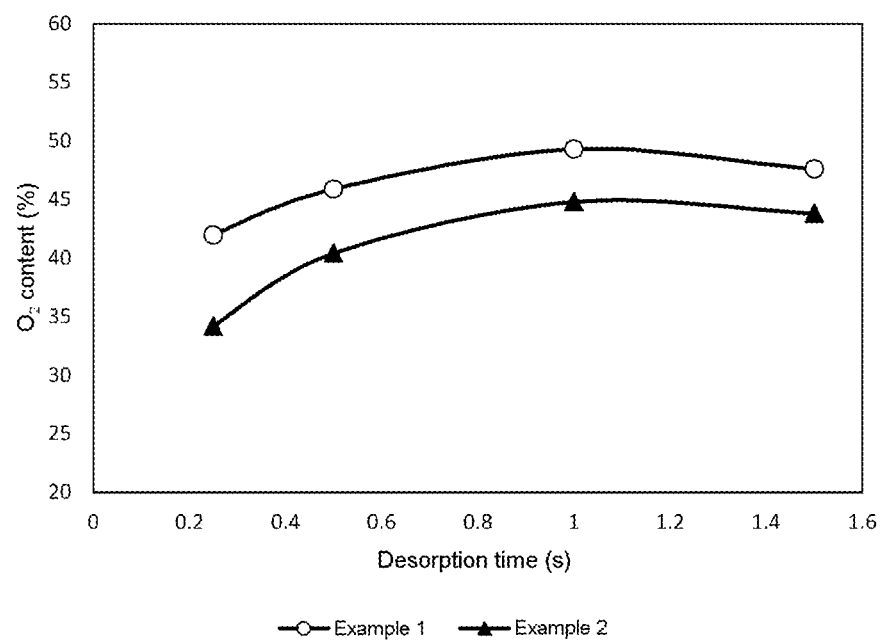
FIG. 2 is a graph showing the oxygen content of a gas stream as a function of desorption time for an embodiment of the invention and for a comparative example.

FIG. 2 shows the oxygen content of the stream produced at outlet (9) as a function of the desorption time fixed for the materials of example 1 and example 2. Despite a lower weight loaded into the column, the material of example 1 (according to the invention) proves to be much more efficient than the solid of example 2 (comparative).

The invention claimed is:

1. A process for separation of oxygen gas components and nitrogen gas components from an oxygen/nitrogen gas mixture, wherein the process comprises:
   feeding the oxygen/nitrogen gas mixture to at least one zeolite adsorbent material;
   separating the oxygen gas components present in the oxygen/nitrogen gas mixture by selective adsorption of the nitrogen gas components with the at least one zeolite absorbent material;
   recovering the separated oxygen gas components; and
   recovering the adsorbed nitrogen gas components by desorption,
   wherein the at least one zeolite adsorbent material comprises at least one A zeolite, and has physical properties that are measured on the at least one zeolite adsorbent material that has been at least 90% by weight exchanged with calcium, and
   wherein the physical properties comprise:
   an external surface area, measured by nitrogen adsorption and expressed in m$^2$ per gram of the at least one zeolite adsorbent material greater than 20 m$^2 \cdot g^{-1}$;
   a non-zeolite phase (PNZ) content of 3≤PNZ≤18% as measured by X-ray diffraction (XRD), by weight relative to the total weight of the at least one zeolite adsorbent material;
   a mesopore volume of between 0.07 cm$^3 \cdot g^{-1}$ and 0.18 cm$^3 \cdot g^{-1}$; and
   an Si/Al atomic ratio of between 1.0 and 2.0.

2. The process according to claim 1, wherein the at least one zeolite adsorbent material has a (Vmicro−Vmeso)/Vmicro ratio of between −0.5 and 1.0, limits not included, where Vmicro is the micropore volume measured by the Dubinin-Raduskevitch method and Vmeso is the mesopore volume determined by the Barrett-Joyner-Halenda (BJH) method, wherein all of the measurements are carried out on the at least one zeolite adsorbent material that has been at least 90% by weight exchanged with calcium.

3. The process according the claim 1, wherein the at least one zeolite adsorbent material has a micropore volume (Dubinin-Raduskevitch volume), expressed in cm$^3$ per gram of the at least one zeolite adsorbent material, of between 0.160 cm$^3 \cdot g^{-1}$ and 0.280 cm$^3 \cdot g^{-1}$ as measured on the at least one zeolite adsorbent material that has been at least 90% by weight exchanged with calcium.

4. The process according to claim 1, wherein the at least one A zeolite has an Si/Al atomic ratio equal to 1.00+/−0.05, wherein the Si/Al atomic ratio is measured by solid silicon 29 Nuclear Magnetic Resonance (NMR).

5. The process according to claim 1, wherein the at least one zeolite adsorbent material comprises at least one cation selected from the group consisting of ions of groups IA, IIA, IIIA, IB, IIB, and IIIB of the periodic table, trivalent ions of the lanthanide series of the periodic table, trivalent ions of the rare earth element series of the periodic table, zinc(II) ion, silver (I) ion, cupric (II) ion, chromium (III) ion, ferric (III) ion, ammonium ion, hydronium ion, calcium ion, lithium ion, sodium ion, potassium ion, barium ion, cesium ion, strontium ion, zinc ion, and mixtures thereof.

6. The process according to claim 1, wherein the at least one zeolite adsorbent material comprises at least one 3A zeolite, wherein the at least one 3A zeolite is mesoporous.

7. The process according to claim 1, wherein the at least one zeolite adsorbent material comprises at least one mesoporous A zeolite, wherein the at least one mesoporous A zeolite is selected from the group consisting of 3A zeolite, 4A zeolite, 5A zeolite, and mixtures thereof.

8. The process according to claim 1, wherein the at least one zeolite adsorbent material comprises at least one mesoporous 5A zeolite.

9. The process according to claim 1, wherein the oxygen/nitrogen gas mixture comprises air and at least one impurity, wherein the at least one impurity is selected from the group consisting of carbon monoxide, ammonia, hydrocarbons, alcohols and mixtures thereof.

* * * * *